United States Patent
Roberts

(10) Patent No.: US 10,938,099 B1
(45) Date of Patent: Mar. 2, 2021

(54) SURFACE DIELECTRIC MEASUREMENT METHOD AND APPARATUS

(71) Applicant: Geophysical Survey Systems, Inc., Nashua, NH (US)

(72) Inventor: Roger Roberts, Amesbury, MA (US)

(73) Assignee: GEOPHYSICAL SURVEY SYSTEMS, INC., Nashua, NH (US)

( * ) Notice: Subject to any disclaimer, the term of this patent is extended or adjusted under 35 U.S.C. 154(b) by 98 days.

(21) Appl. No.: 16/405,209

(22) Filed: May 7, 2019

Related U.S. Application Data

(60) Provisional application No. 62/672,110, filed on May 16, 2018.

(51) Int. Cl.
  *H01Q 1/48* (2006.01)
  *G01S 13/86* (2006.01)
  *H01Q 1/36* (2006.01)

(52) U.S. Cl.
  CPC .............. *H01Q 1/48* (2013.01); *G01S 13/86* (2013.01); *H01Q 1/36* (2013.01)

(58) Field of Classification Search
  CPC ............. H01Q 1/48; H01Q 1/36; G01S 13/86
  See application file for complete search history.

(56) References Cited

U.S. PATENT DOCUMENTS

| | | | | |
|---|---|---|---|---|
| 5,457,394 A | * | 10/1995 | McEwan | G01F 23/284 324/642 |
| 5,641,901 A | * | 6/1997 | Powell | G01N 3/56 73/146 |
| 5,713,356 A | * | 2/1998 | Kruger | A61B 5/0095 600/407 |
| 5,952,561 A | * | 9/1999 | Jaselskis | E01C 19/288 73/78 |
| 6,525,540 B1 | * | 2/2003 | Kong | G01S 7/03 324/338 |
| 7,288,944 B1 | | 10/2007 | Tonn | |
| 2018/0292525 A1 | * | 10/2018 | Smith | G01S 13/887 |
| 2019/0167500 A1 | * | 6/2019 | Baker | G01S 13/878 |
| 2019/0227160 A1 | * | 7/2019 | Wilens | G01S 7/285 |
| 2019/0257771 A1 | * | 8/2019 | Desmulliez | H01Q 13/02 |
| 2020/0011988 A1 | * | 1/2020 | Nakayama | G01S 13/58 |
| 2020/0191989 A1 | * | 6/2020 | Roberts | G01V 3/12 |

(Continued)

OTHER PUBLICATIONS

Imad ; In-Place Hot Mix Asphalt Density Estimation Using Ground Penetrating Radar; Dec. 2011 (Year: 2011).*

(Continued)

*Primary Examiner* — Renan Luque
(74) *Attorney, Agent, or Firm* — Michael J. Feigin, Esq.; Feigin and Fridman LLC

(57) ABSTRACT

A device implementing antennas transmitting and receiving electromagnetic waves for measuring the surface dielectric of a pre-defined surface area is disclosed herein. This area can be a small portion of a large surface, or a surface of a sample extracted from a larger volume. The sample might be cylindrical in shape. The device includes a dielectric spacer of known dielectric properties and geometries, placed between the material under test and the transmitting and receiving antennas. The dielectric value and thickness of the dielectric spacer are selected so as to control the effective area over which the dielectric is measured.

18 Claims, 10 Drawing Sheets

(56) References Cited

U.S. PATENT DOCUMENTS

2020/0256976 A1* 8/2020 Roberts ................ G01S 13/865

OTHER PUBLICATIONS

Hoegh; Evaluating asphalt concrete air void variation via GPR antenna array data; Mar. 2015 (Year: 2015).*

Khazanovich; Non-destructive Evaluation of Bituminous Compaction Uniformity Using Rolling Density; Oct. 2017 (Year: 2017).*

Agilent Technologies, Agilent Basics of Measuring the Dielectric Properties of Materials: Application Note, Jun. 2006, #5989-2589EN [Date accessed May 2, 2019].

Shimizu, Takashi. "Cut-Off Circular Waveguide Method for Dielectric Substrate Measurements in Millimeter Wave Range." IEICE Trans. Electron. vol. E87-C, No. 5, May 2004: pp. 672-680 [Date accessed Mar. 28, 2018].

Gunasekaran, S. et al. "Dielectric Studies of Some Rubber Materials at Microwave Frequencies." Indian Journal of Pure & Applied Physics, vol. 46, Oct. 2008: pp. 733-737 [Date accessed Apr. 19, 2018].

Venkatesh, M.S. et al. "An Overview of Dielectric Properties Measuring Techniques." Canadian Biosystems Engineering, vol. 47, 2005: pp. 7.15-7.30 [Date accessed Mar. 28, 2018].

Cravey, Roblin L. et al. Dielectric Property Measurements in the Electromagnetic Properties Measurements Laboratory. NASA Technical Memorandum 110147, Langley Research Center, Hampton, VA, Apr. 1995 [Date accessed May 2, 2018].

MD. Maniruzzaman, B. A. Aziz et al. "Preliminary Determination of Asphalt Properties Using Microwave Techniques." ARPN Journal of Engineering and Applied Sciences, vol. 5, No. 11, Nov. 2010: pp. 70-80 [Date accessed Mar. 28, 2018].

Filali, Bilal. "Dielectric Properties of Concrete." IEEE Transactions on Microwave Theory and Techniques, Nov. 2008: pp. 2322-2328 [Date accessed May 2, 2018].

Gaoyuan-Ci et al. "Waveguide Method for Measuring Dielectric Constant of Asphalt Concrete at 2.45GHz." Proceedings of the 7th WSEAS International Conference on Systems Theory and Scientific Computation, Athens, GA, Aug. 24-26, 2007: pp. 291-293 [Date accessed Mar. 26, 2018].

* cited by examiner

SURFACE DIELECTRIC MEASUREMENT METHOD AND APPARATUS

FIELD OF THE DISCLOSED TECHNOLOGY

The disclosed technology relates generally to an apparatus and method for calculating the surface dielectric of a medium, and, more specifically, to an apparatus and method for making wide-band real-time surface dielectric measurements of localized areas in situ or in samples of media extracted from a larger source. The disclosed technology is particularly suited for surface dielectric measurement of regularly sized samples of media.

BACKGROUND OF THE DISCLOSED TECHNOLOGY

The measurement of dielectric is a straight-forward process when performed using waveguide methods (Tonn, David A., U.S. Pat. No. 7,288,944) or Microwave Free-Space methods (Aziz, Md. Maniruzzaman B. A., et, al, 2010, ARPN Journal of Engineering and Applied Sciences, v. 5, no 11). These methods, however, are limited in their applicability to usage in controlled environments, such as laboratories, and require samples with very specific geometries. Therefore, such methods cannot measure the localized dielectric of a large surface having varying dielectric properties.

Another method of measuring dielectric is using an open-ended coaxial probe. Such a probe is portable, but has a different set of limitations. The coaxial probe requires good contact with the medium being tested, and the medium surface must be at least as flat as the probe face. Additionally, the sample thickness must be sufficient so that the sample appears infinite to the probe. Furthermore, there are accuracy limitations to this method, which has an accuracy of about 5% according to NASA Technical Memorandum 110147.

Another method for measuring the dielectric of a medium in situ, which is increasingly being used, is ground penetrating radar (GPR). This method has been applied for decades to accurately measure the surface dielectric of asphalt using non-contact horn antennas, which are typically mounted on vehicles.

More recently, smaller-size dipole-type antennas have been used to measure the dielectric of asphalt to a higher degree of accuracy. These dipole-type antennas have been used in a non-contact manner similar to the aforementioned horn antennas. In use, such dipole-type antennas are mounted 6 to 12 inches above the asphalt surface, thereby illuminating an area approximately 6" in diameter, while being sensitive to edge diffractions from large dielectric discontinuities over a greater diameter.

Measurement of the dielectric of cores, varying in thickness from 0.5 inches to greater than 6 inches, and of asphalt cylinders manufactured by gyratory compactors, in near real-time, is especially important to industries that rely on calibrating dielectric measurements to variations in asphalt compaction using cores or manufactured cylinders. Currently, such measurements can only accurately be accomplished using waveguide methods, which are impractical outside of laboratory conditions.

An additional feature which would be beneficial to the industry is the ability to measure the surface dielectric of a pre-defined small area in real-time, for example, for the purpose of selecting locations to core. The waveguide method is unsuitable for this task.

Thus, there is a need in the industry for a device and/or a method for quickly and accurately measuring the dielectric of cores and manufactured asphalt specimens that may be, for example, approximately 6" in diameter, and for measuring the in situ surface dielectric of small areas on a large surface.

SUMMARY OF THE DISCLOSED TECHNOLOGY

According to an aspect of some embodiments of the teachings herein, there is provided an apparatus for measuring a surface dielectric of a material under test (MUT) over a predefined area. The apparatus includes a ground penetrating radar (GPR) antenna, for measuring the surface dielectric of the MUT over the predefined area, and a dielectric spacer, disposed directly beneath the GPR antenna. A transmitter is functionally associated with the GPR antenna, and is useful for transmitting measurements obtained by the GPR antenna to a remote location, such as a controlling computer. The dielectric spacer may be designed and selected to slow propagation of waves through the spacer, so as to prevent interference to the surface dielectric measurement from signals arriving from edges of the predefined area.

In some embodiments, the dielectric spacer is in direct contact with the surface of the MUT. In some embodiments, the dielectric spacer includes a substantially homogenous substrate. In some embodiments, the dielectric spacer has a higher dielectric than air. For example, the dielectric spacer may have an estimated dielectric close to that of the MUT. In some embodiments, the dielectric spacer is mounted onto a plurality of wheels, so that it is movable relative to the MUT during measurements by the GPR antenna. In these cases, the dielectric spacer is elevated above the MUT. In some embodiments, a thickness of the dielectric spacer is selected based on a size of the predefined area.

In some embodiments, the predefined area is the flat circular area on one end of a cylindrical MUT. In such embodiments, the GPR antenna and the apparatus measure the dielectric of the surface of the cylindrical MUT. The cylindrical MUT may be, for example, an asphalt core. In some embodiments, the GPR antenna and the apparatus measure the surface dielectric of a sample of asphalt representing a range of compaction levels, to establish the relationship between a dielectric and a compaction level for a given asphalt mixture.

There is further provided, in accordance with another embodiment of the disclosed technology, a method for measuring a surface dielectric of a material under test (MUT) over a predefined area. The method includes placing an apparatus according to the disclosed technology, as described hereinabove, above a surface of the MUT in the predefined area, and subsequently obtaining at least one surface dielectric measurement from the GPR antenna, via the transmitter.

In some embodiments, the dielectric spacer is placed in directed contact with the surface of the MUT. In other embodiments, the dielectric spacer is elevated relative to the surface of the MUT, and obtaining at least one surface dielectric measurement occurs while the apparatus is in motion relative to the surface of the MUT. In some embodiments, the method further includes calibrating a thickness of the dielectric spacer to a size of the predefined area and to the MUT, prior to placing of the apparatus above the surface of the MUT.

In some embodiments, the MUT is a cylindrical MUT, and the predefined area includes the rounded surface of the cylindrical MUT, and the obtained measurements are substantially accurate measurements of the surface dielectric of the side of the cylindrical MUT. In some embodiments, the cylindrical MUT is an asphalt core. In some embodiments, the surface area of the MUT is in the range of 36 square inches and 600 square inches.

In some embodiments, the MUT includes a sample of asphalt representing a range of compaction levels, and the obtaining at least one surface dielectric measurement includes using at least one surface dielectric measurement, establishing a relationship between a dielectric and a compaction level for a given asphalt mixture.

DETAILED DESCRIPTION OF EMBODIMENTS OF THE DISCLOSED TECHNOLOGY

In an embodiment of the disclosed technology, a device implementing antennas transmitting and receiving electromagnetic waves is used for obtaining the surface dielectric of a pre-defined surface area. This area may be a small portion of a large surface, or a surface of a sample extracted from a larger volume. The sample might be cylindrical in shape, such as an asphalt core and or a gyratory-compacted asphalt sample. The device according to the present invention utilizes a medium of known dielectric properties and geometries, referred to as a "dielectric spacer", placed between the material being tested and the transmitting and receiving antennas. The dielectric value and the thickness of the dielectric spacer determine the effective area over which the dielectric is measured. As such, the invention can be utilized to measure the surface dielectric of 6 inch diameter asphalt cores or the surface dielectric of a small area of a large asphalt surface where a 6 inch diameter core will be obtained. Additionally, the invention can be used to measure the surface dielectric of gyratory-compacted asphalt samples to determine the relationship between asphalt dielectric and compaction level for a given asphalt design mixture.

Embodiments of the disclosed technology will become clearer in view of the following description of the drawings.

Figure 1:
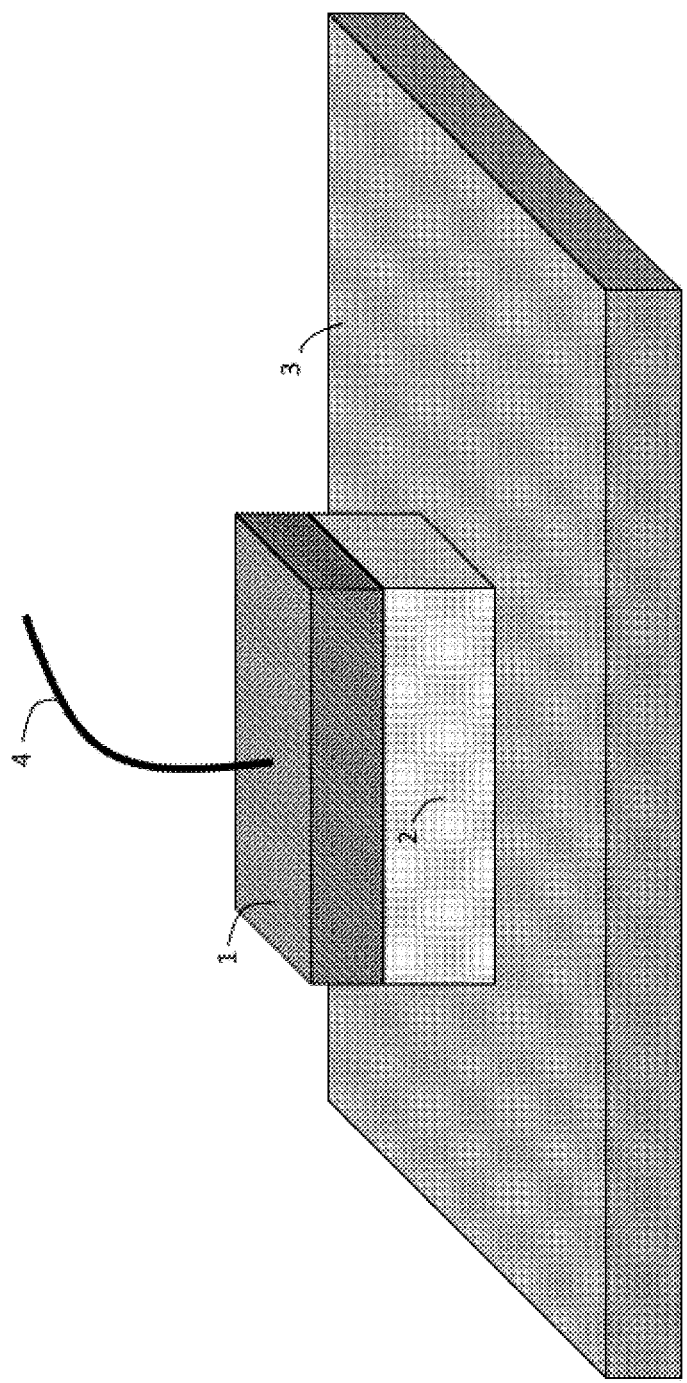
FIG. 1 is a perspective view illustration of an apparatus for measuring a dielectric of a Material Under Test (MUT) according to an embodiment of the disclosed technology, the apparatus including a GPR antenna placed on top of the dielectric spacer, which rests on the MUT.

Reference is now made to FIG. 1, which is a perspective view illustration of an apparatus 10 for measuring a dielectric of a Material Under Test (MUT) 3 according to an embodiment of the disclosed technology. As seen in FIG. 1, a GPR (Ground Penetrating Radar) antenna 1 is disposed on top of a dielectric spacer 2, which is in direct contact with the MUT 3. Measurement information may be transmitted to a control unit or another remote location via a communication cable 4 extending from GPR antenna 1.

The apparatus 10 measures the dielectric over the surface area of the antenna 1. In some embodiments, the apparatus 10 is designed to minimize the surface area over which the dielectric is measured.

In some embodiments, the dielectric spacer 2 is a substantially homogeneous substrate. In some embodiments, the dielectric spacer 2 has a higher dielectric than air, and sometimes has an estimated dielectric which is close to that of the medium being measured, thus causing slower propagation of waves there-through. In the context of the present application and claims, "close to" relates to two measurements being within 10%, within 20%, within 25% and/or within 30% of each other.

Figure 2:
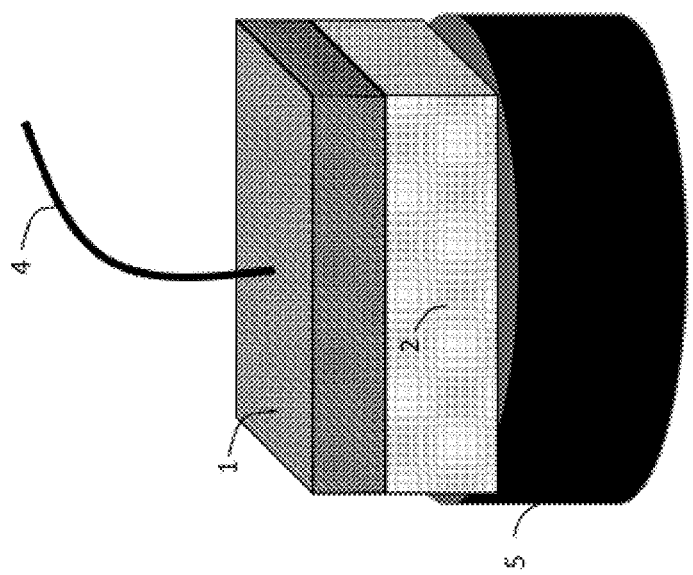
FIG. 2 is a perspective view of the apparatus shown in FIG. 1 placed on top of a cylindrical MUT, according to an embodiment of the disclosed technology.

FIG. 2 is a perspective view of the apparatus 10, placed on top of a cylindrical MUT 5, according to an embodiment of the disclosed technology. The cylindrical MUT 5 may be of any suitable material, such as, for example, an asphalt core.

Figure 3:
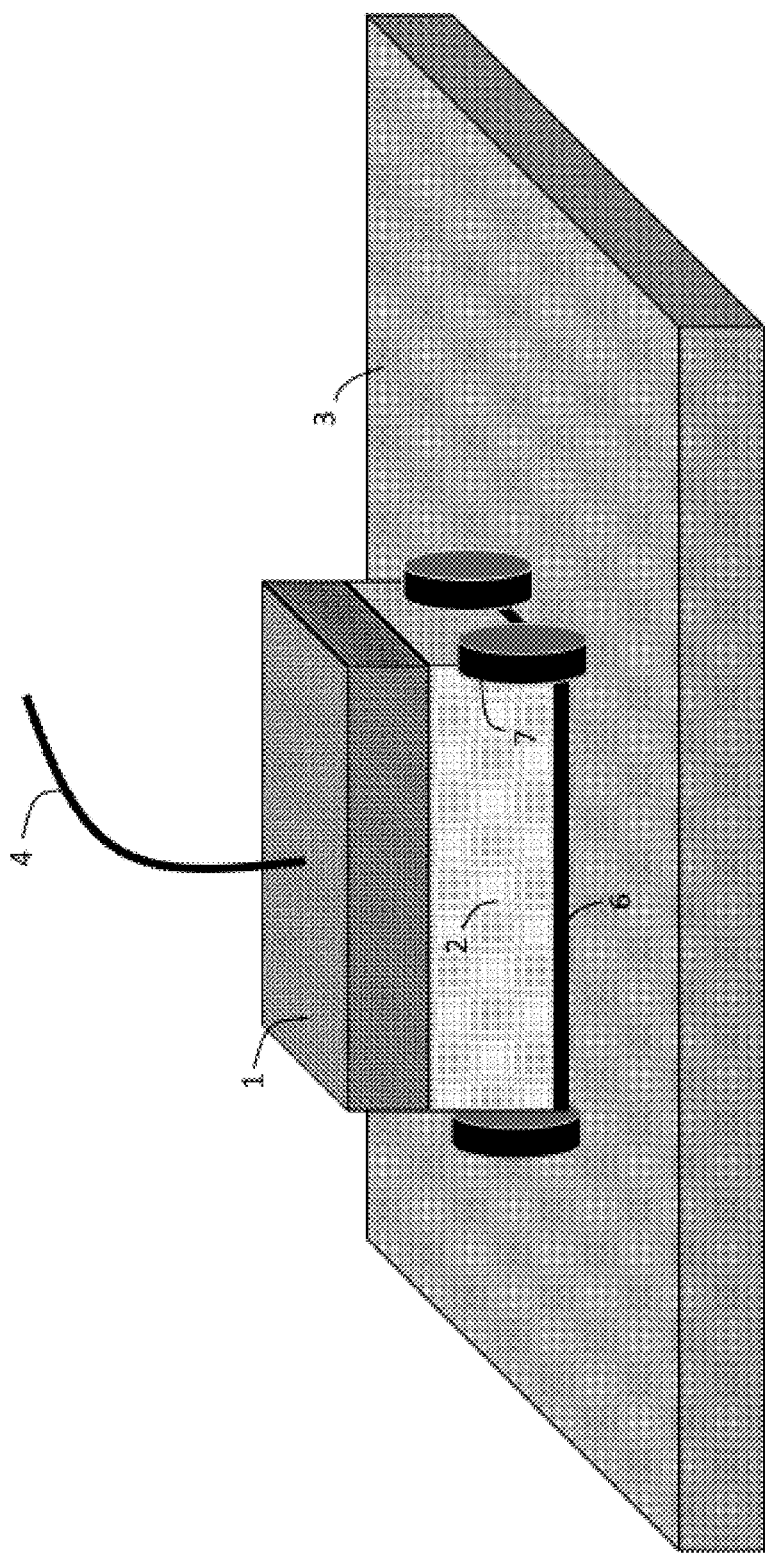
FIG. 3 is a perspective view of the apparatus shown in FIG. 1, modified to include wheels and to be elevated above the MUT according to an embodiment of the disclosed technology.

FIG. 3 is a perspective view of the apparatus 10 of FIG. 1, disposed above a MUT 3. The apparatus of FIG. 3 is modified to include wheels 7 connected to a base surface or to axles 6. In this embodiment, the apparatus 10 is elevated above the MUT 3 to a small degree, so as to facilitate dielectric measurements while the apparatus is moved over the surface of MUT 3. In some embodiments, the distance between a lower surface of dielectric spacer 2 and the upper surface of MUT 3 is in the range of 2 to 10 mm.

In some embodiments, and particularly for application involving measurement of a dielectric from a defined surface area, such as a cylinder, the dielectric material/values of the dielectric spacer 2, and thickness of the dielectric spacer 2 are selected such that the reflection which is the earliest to arrive at GPR antenna 1 from the surface area is not impacted by diffractions arriving at GPR antenna 1 from edges of the surface area at a later stage.

Figure 4:
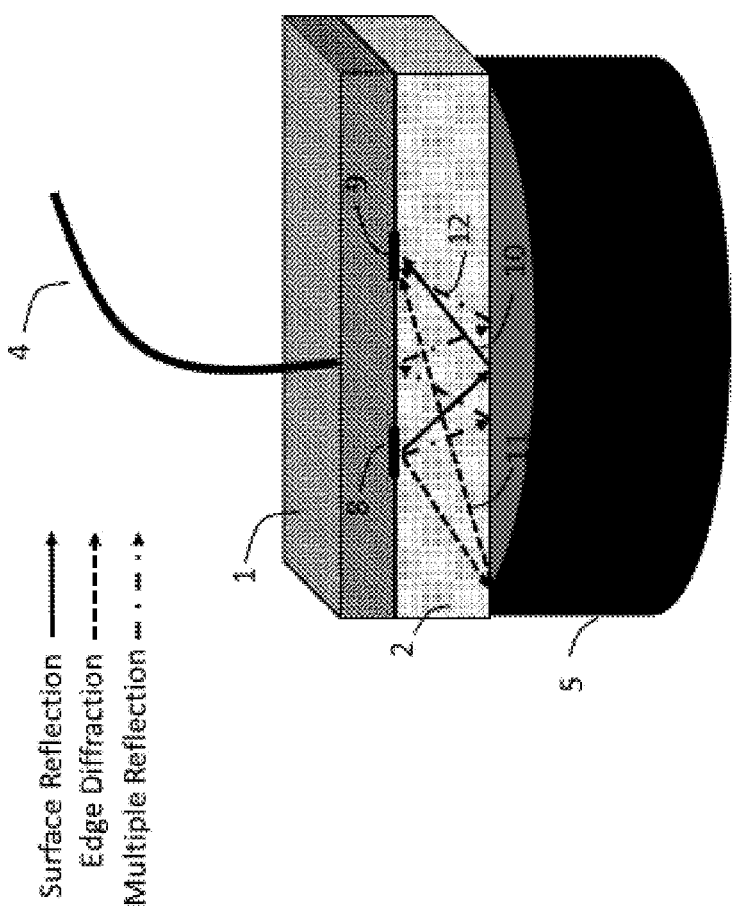
FIG. 4 is a perspective view of the apparatus shown in FIG. 3 including travel paths of radiated energy that are used for calculations according to an embodiment of the disclosed technology.

FIG. 4 is a perspective view of the apparatus 10 of FIG. 3, including travel paths of radiated energy that are used for calculations according to an embodiment of the disclosed technology. Specifically, FIG. 4 shows the GPR antenna 1 and dielectric spacer 2, indicating locations of centers of a transmitting antenna 8 and a receiving antenna 9. FIG. 4 additionally illustrates the surface reflection travel path 10, the edge diffraction travel path 11, and multiple reflection travel paths 12. Knowledge of the separation distance between the transmitting and receiving antennas, the width of the transmit pulse used to obtain the reflection amplitude, and the diameter of the surface area of the MUT, here shown as cylinder 5, enables calculation of the arrival times of energy from each of the different paths 10, 11, and 12 for different dielectric spacer 2 thicknesses and dielectrics.

In use, a response from MUT 3 being measured with GPR antenna 1 of apparatus 10 arrives after a certain time delay, due to the presence of dielectric spacer 2 and the slow propagation of waves through the dielectric spacer. A difference in a peak of the measurement wave is more noticeable between a straight path and an angled path, the most angled path hitting an outer edge of the surface area whose dielectric is being measured. The diffraction at the edge, and reflection, cannot be separated from the rest of the dielectric measurements due to the more separate waveform produced in the response.

The dielectric spacer 2 can have a measured dielectric which is calibrated and accounted for (removed in the calculations of the received response) after measuring a medium there-through. This allows pucks, or thin cylindrical parts of asphalt or other MUTs to be measured, which pucks have a smaller diameter than previously able to be measured with this level of accuracy. A core sample, which has, for example, a 6 inch diameter, flat upper and lower side, and a round edge there-between of a thickness of perhaps ½ inch, can be measured using ground penetrating radar in embodiments of the disclosed technology.

Figure 5:
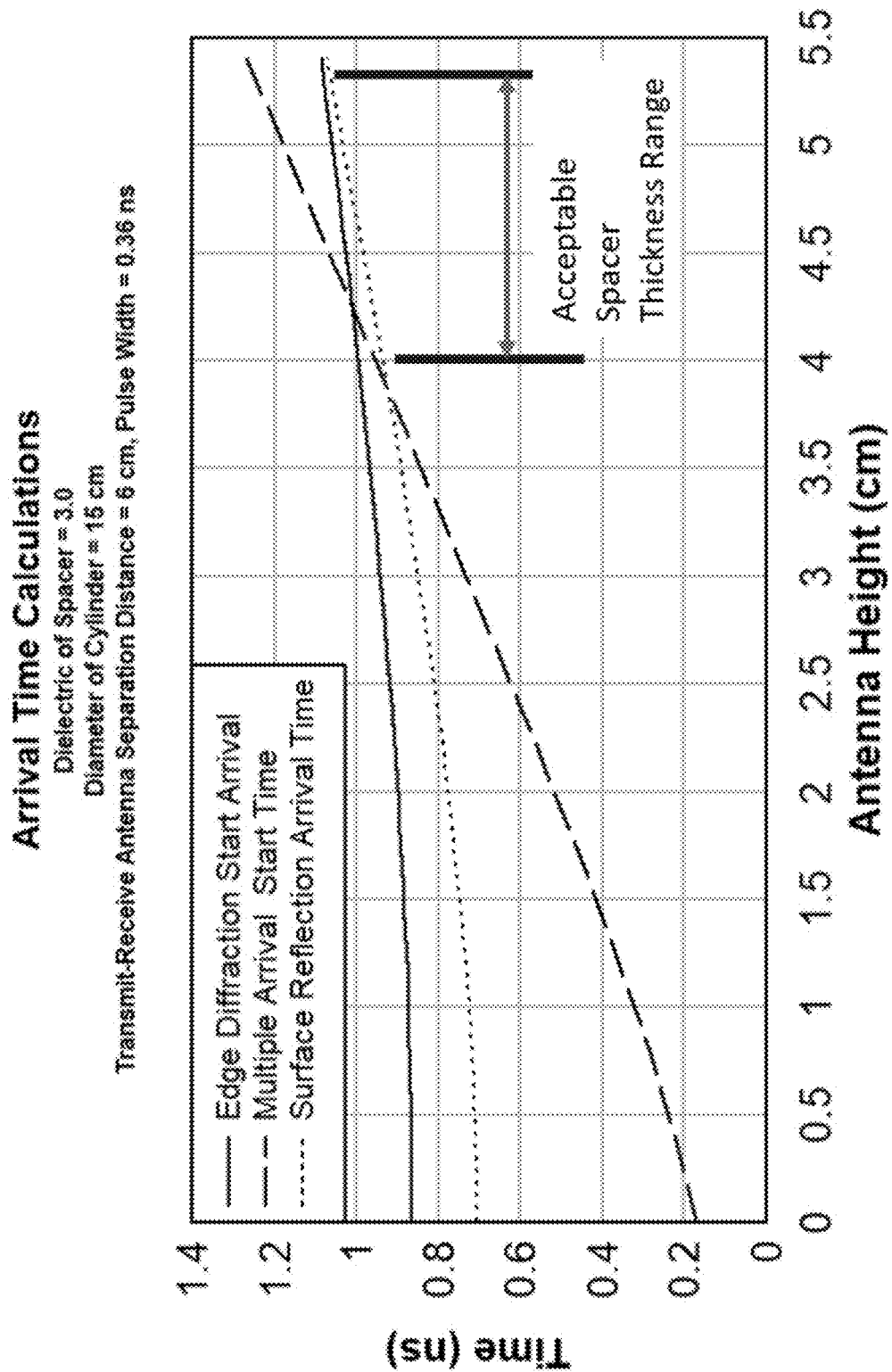
FIG. 5 is a graph demonstrating different reflection and diffraction arrival times calculated and used to determine the dielectric and thickness of the dielectric spacer placed between the antennas and the MUT according to an embodiment of the disclosed technology.

FIG. 5 is a graph demonstrating different reflection and diffraction arrival times calculated and used to determine the dielectric and thickness of the dielectric spacer placed between the antennas and the MUT according to an embodiment of the disclosed technology.

As seen in FIG. 5, for a cylinder having a diameter of 15 cm, a separation distance of 6 cm between the transmitting and receiving antennas, and a pulse width of 0.36 ns, a dielectric spacer with a dielectric of 3.0 will provide the required time isolation for the surface reflection arrival time if the spacer thickness is in the range of 4 cm to 5.5 cm. This is due to the fact that in this range of thicknesses, or antenna heights, the surface reflection arrival time slightly precedes the edge diffraction arrival start time.

Figure 6:
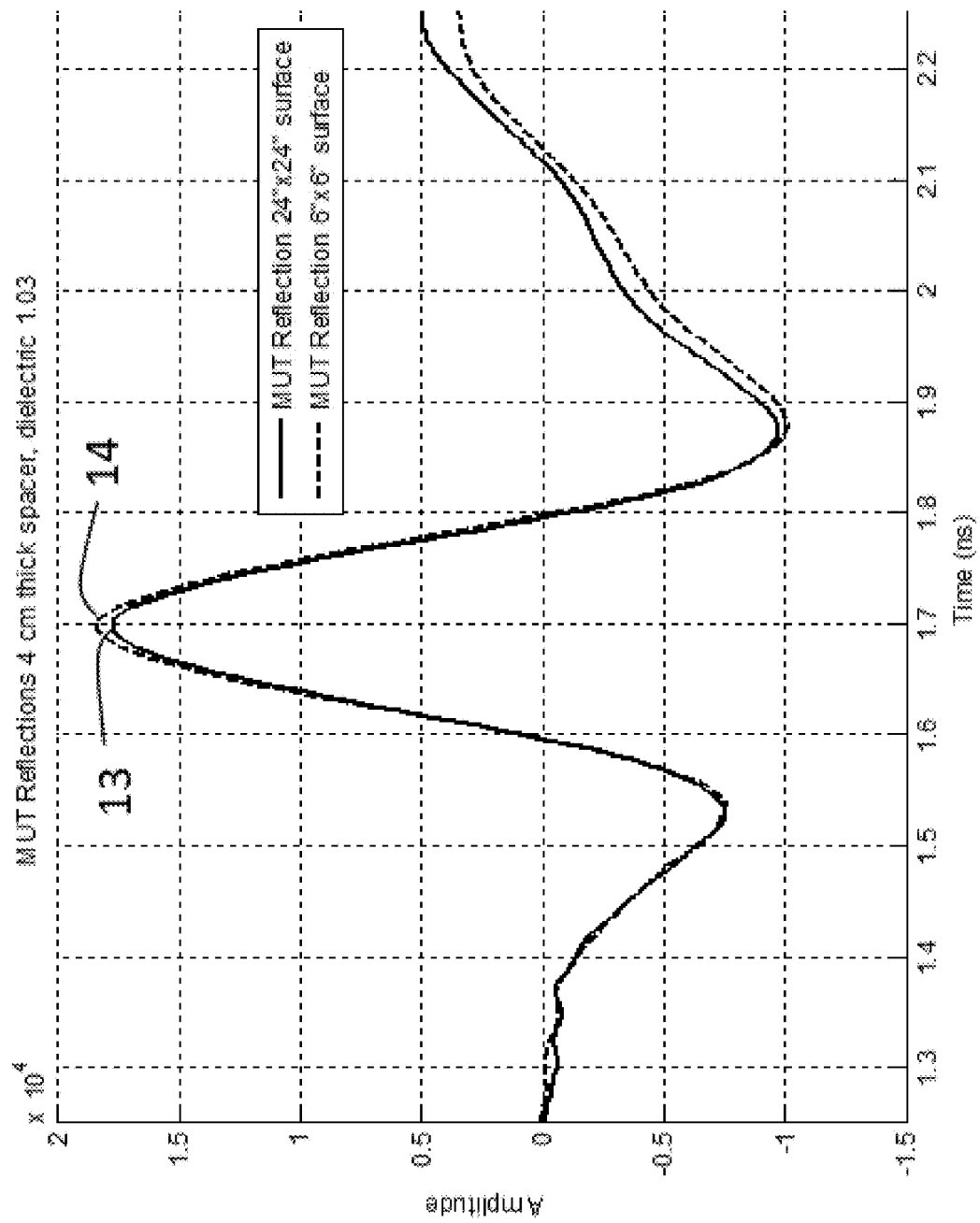
FIG. 6 is a graph demonstrating exemplary surface reflections obtained when the spacer shown in FIG. 1 is replaced by Styrofoam.

FIG. 6 is a graph demonstrating exemplary surface reflections obtained when the dielectric spacer 2 shown in FIG. 1 is replaced by Styrofoam. As seen, FIG. 6 includes isolated surface reflections obtained from two different MUT's of approximately the same dielectric but having differing surface areas, where the reflection from a MUT having a surface area of 24"×24" is indicated with a solid line, and the reflection from a MUT having a surface area of 6"×6" is indicated with a dashed line. The Styrofoam served to create an approximate air gap between the antenna and the surface.

As seen, the positive peak amplitude 13 of the isolated reflection from the 24"×24" surface is noticeably different, and greater, than the positive peak amplitude 14 of the isolated surface reflection from the 6"×6" surface area. This is due to interference of diffracted energy arriving from the edges of the 6"×6" MUT.

Figure 7:
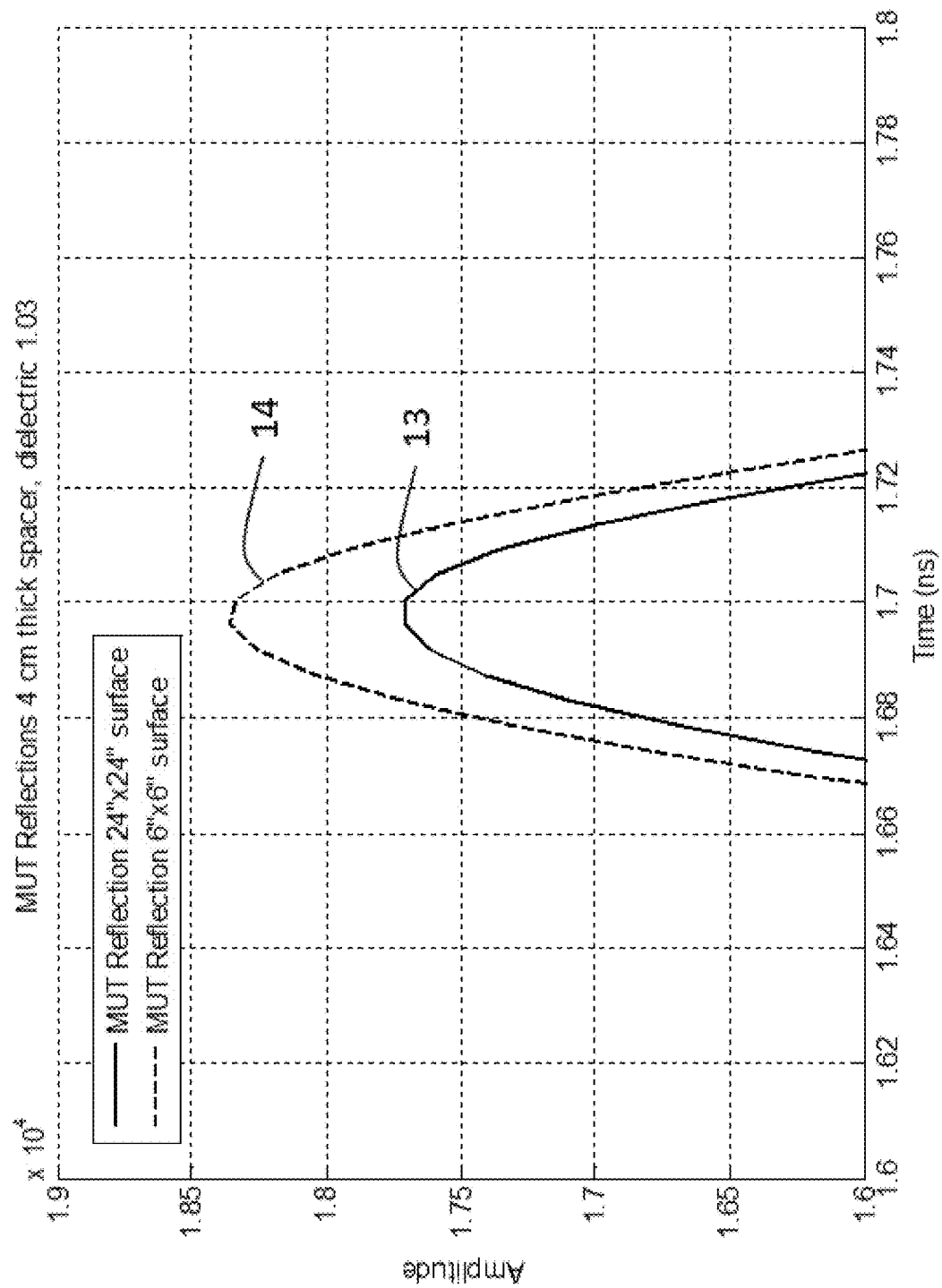
FIG. 7 is a zoomed in view of FIG. 6 showing the difference between reflection amplitude values from two different size MUTs.

FIG. 7 shows a zoomed in view of the isolated surface reflection amplitudes from the same MUTs as in FIG. 6. As seen in FIG. 7, the difference in the maximum peak amplitudes 13 and 14 taken from the larger and smaller MUT surface areas, respectively, is in the order of several percent.

Figure 8:
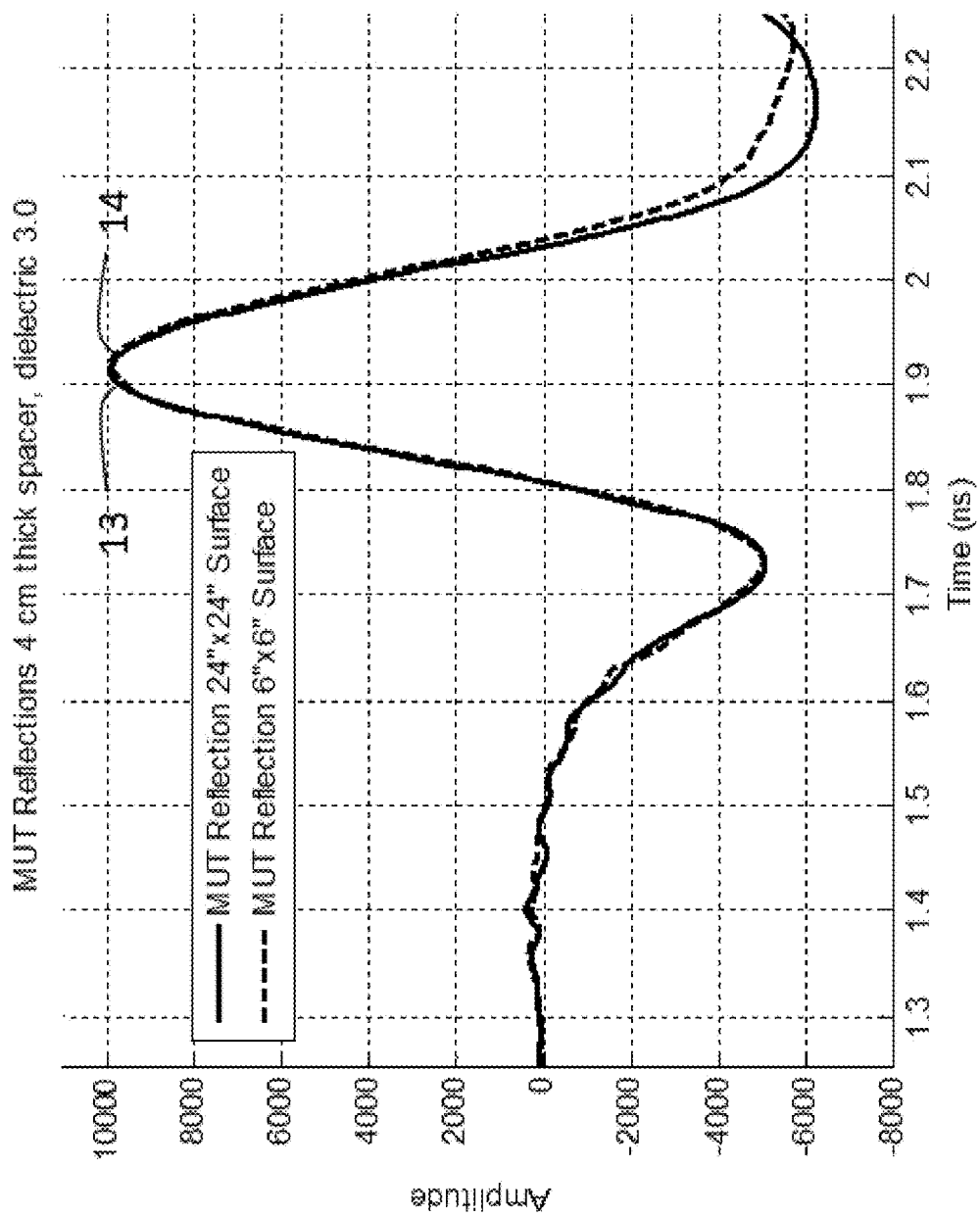
FIG. 8 is a graph demonstrating exemplary surface reflections obtained using the apparatus of FIG. 1.
Figure 9:
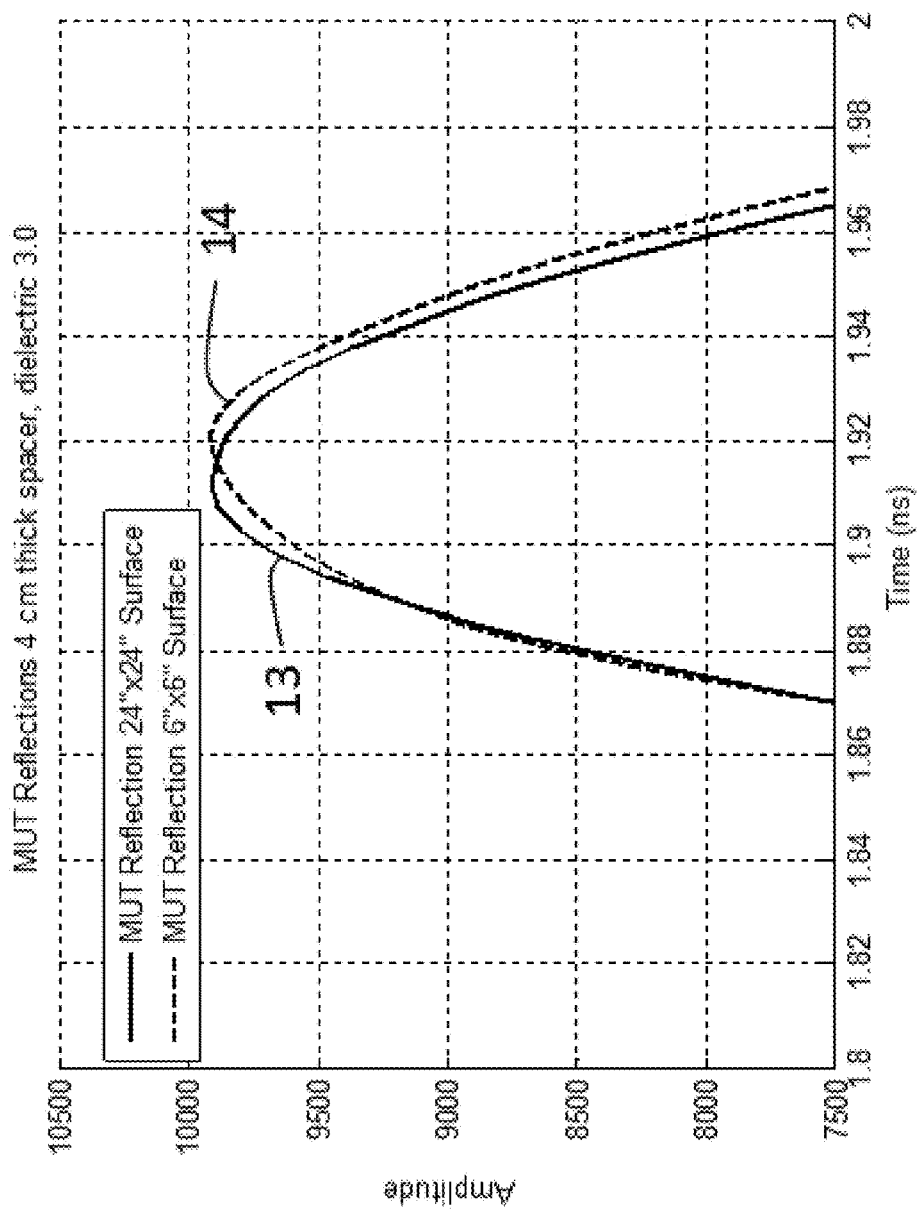
FIG. 9 is a zoomed in view of FIG. 8 demonstrating a negligible difference between reflection amplitude values from two different size MUTs.

FIG. 8 is a graph demonstrating exemplary surface reflections obtained using the apparatus of FIG. 1, from a MUT with a surface area of 24"×24" and a MUT of the approximate same dielectric with a surface area of 6"×6", similar to the MUTs used for the graph of FIG. 6, and using a dielectric spacer 2 between the antenna 1 and the MUT surface. As seen in FIG. 8, the maximum peak amplitude obtained from both MUTs is substantially identical. This is evidenced also by the graph of FIG. 9, which is a zoomed in view of the waveform peaks shown in FIG. 8, and which shows that the positive peak amplitudes 13 and 14 obtained from the 24"×24" and 6"×6" MUT surfaces, respectively, are approximately the same. This is due to the fact that the dielectric spacer 2, disposed between the MUT surfaces and the antenna, delays the arrival of diffracted energy from the edges of the 6"×6" MUT sufficiently such that the arrival of the diffracted energy does not interfere with the arrival time of positive peak 14. As such, comparison of FIGS. 8 and 6, and of FIGS. 9 and 7, demonstrates the advantage of the disclosed technology over prior art methods, and the accuracy of dielectric measurement from a small surface area when using the device 10 of the disclosed technology.

Figure 10:
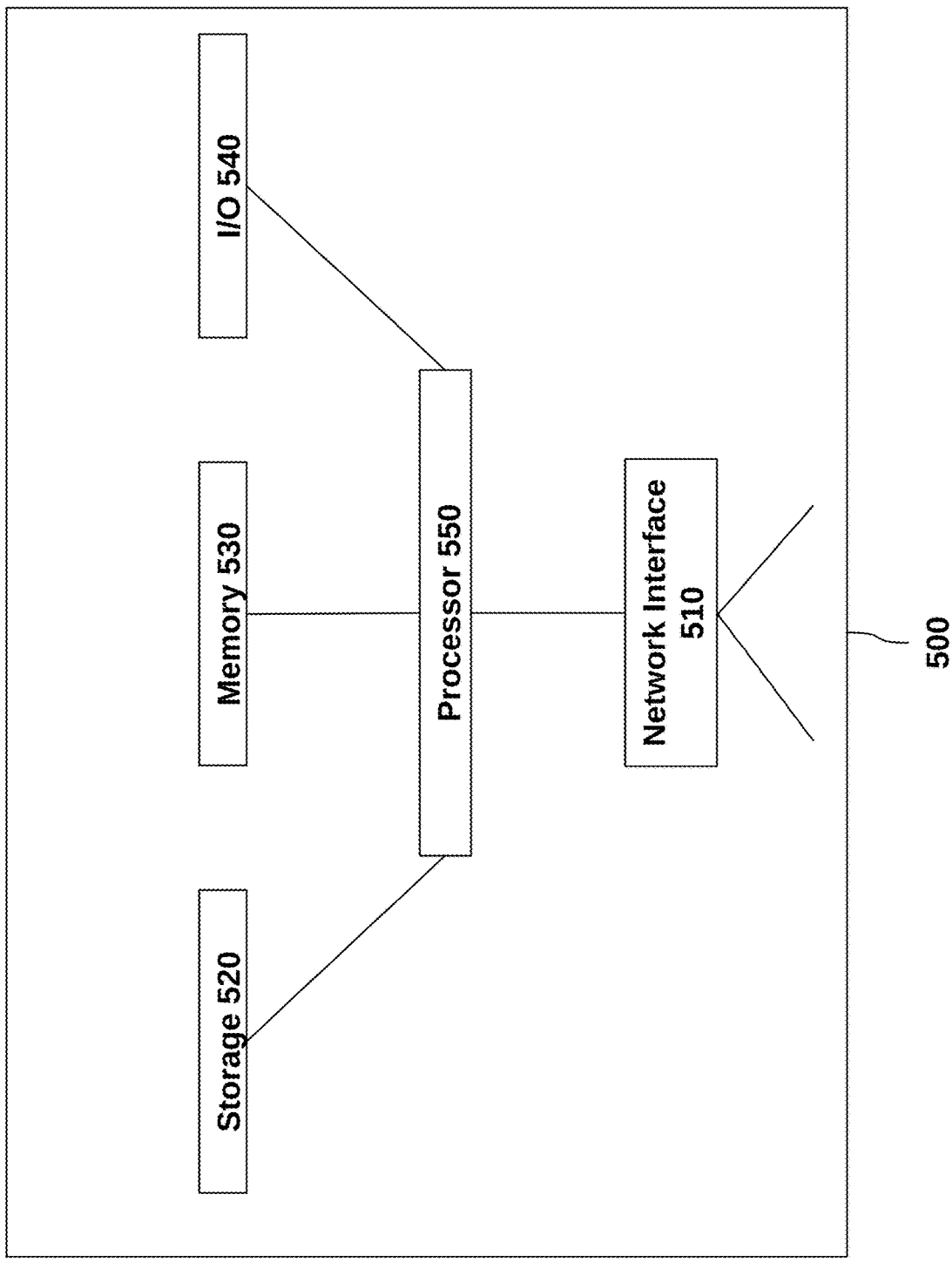
FIG. 10 is a high-level block diagram of a device that may be used to carry out the disclosed technology.

FIG. 10 shows a high-level block diagram of a device that may be used to carry out the disclosed technology. Device 500 comprises a processor 550 that controls the overall operation of the computer by executing the measurement device's program instructions which define such operation. The measurement device's program instructions may be stored in a storage device 520 (e.g., magnetic disk, flash disk, database) and loaded into memory 530 when execution of the measurement device's program instructions is desired. Thus, the measurement device's operation will be defined by the measurement device's program instructions stored in memory 530 and/or storage 520, and the measurement device will be controlled by processor 550 executing the measurement device's program instructions. A device 500 also includes one or a plurality of input network interfaces for communicating with other devices via a network (e.g., the internet). A device 500 also includes one or more output network interfaces 510 for communicating with other devices. Device 500 also includes input/output 540 representing devices which allow for user interaction with the computer 500 (e.g., display, keyboard, mouse, speakers, buttons, etc.). One skilled in the art will recognize that an implementation of actual devices will contain other components as well, and that FIG. 10 is a high level representation of some of the components of such a measurement device for illustrative purposes. It should also be understood by one skilled in the art that the method and devices depicted in FIGS. 1 through 9 may be implemented on a device such as is shown in FIG. 10.

For purposes of this disclosure, the term "substantially" is defined as "at least 95% of" the term which it modifies. Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. An apparatus for measuring a surface dielectric of a material under test (MUT) over a predefined area, the apparatus comprising:

a ground penetrating radar (GPR) antenna measuring the surface dielectric of the MUT over the predefined area;

a dielectric spacer, disposed directly beneath said GPR antenna, said dielectric spacer propagating waves to prevent interference from signals arriving from outside the predefined area; and a transmitter, functionally attached to said GPR antenna, for transmitting measurements obtained by said GPR antenna, a thickness of said dielectric spacer is selected such that the reflection, which is the earliest to arrive at said GPR antenna, from a surface area of the MUT is not impacted by diffractions arriving at said GPR antenna from edges of the surface area of the MUT.

2. The apparatus of claim 1, wherein said dielectric spacer is in direct contact with the surface of the MUT.

3. The apparatus of claim 1, wherein said dielectric spacer comprises a substantially homogenous substrate.

4. The apparatus of claim 1, wherein said dielectric spacer has a higher dielectric than air.

5. The apparatus of claim 1, wherein said dielectric spacer has an estimated dielectric close to that of the MUT.

6. The apparatus of claim 1, wherein said dielectric spacer is mounted onto a plurality of wheels, and is movable relative to the MUT during measurements by said GPR antenna.

7. The apparatus of claim 6, wherein said dielectric spacer is elevated above the MUT, thereby forming a space between the dielectric spacer and the MUT.

8. The apparatus of claim 1, wherein a thickness of said dielectric spacer is selected based on a size of said pre-defined area.

9. The apparatus of claim 1, wherein said predefined area is a portion of the flat surface or rounded side of a cylindrical MUT, and wherein said GPR antenna and said apparatus substantially accurately measuring the surface dielectric of the surface of said cylindrical MUT.

10. The apparatus of claim 1, said GPR antenna and said apparatus measuring the surface dielectric of a sample of asphalt representing a range of compaction levels to establish the relationship between a dielectric and a compaction level for a given asphalt mixture.

11. A method for measuring a surface dielectric of a material under test (MUT) over a predefined area, the method comprising:

placing the apparatus of claim 1 above a surface of the MUT in the predefined area; and obtaining at least one surface dielectric measurement from said GPR antenna, via said transmitter.

12. The method of claim 11, wherein said placing comprises placing said dielectric spacer in directed contact with said surface of the MUT.

13. The method of claim 11, wherein said placing comprises placing said dielectric spacer above said surface of the MUT and elevated therefrom, thereby forming a space between the dielectric spacer and the MUT, and wherein said obtaining at least one surface dielectric measurement comprises obtaining said at least one surface dielectric measurement while said apparatus is in motion relative to said surface of the MUT.

14. The method of claim 11, further comprising, prior to said placing, calibrating a thickness of said dielectric spacer to a size of said pre-defined area and to the MUT.

15. The method of claim 11, wherein the MUT is a cylindrical MUT, said predefined area is a circular surface of said cylindrical MUT, and said obtaining comprises obtaining substantially accurate measurements of the surface dielectric of said surface of said cylindrical MUT.

16. The method of claim 15, wherein said cylindrical MUT comprises an asphalt core.

17. The method of claim 11, wherein the surface area of the MUT in the range of 36 square inches and 600 square inches.

18. The method of claim 11, wherein said MUT comprises a sample of asphalt representing a range of compaction levels, and said obtaining at least one surface dielectric measurement comprises using said at least one surface dielectric measurement, establishing a relationship between a dielectric and a compaction level for a given asphalt mixture.

* * * * *